United States Patent [19]

Ookubo et al.

[11] Patent Number: 5,482,151
[45] Date of Patent: Jan. 9, 1996

[54] LOCKUP UNIT FOR TORQUE CONVERTER HAVING A FRICTION ELEMENT

[75] Inventors: Mamoru Ookubo, Neyagawa; Mitsugu Yamaguchi, Osaka; Shigeru Takeshita, Neyagawa, all of Japan

[73] Assignee: Kabushiki Kaisha Daikin Seisakusho, Neyagawa, Japan

[21] Appl. No.: 312,739

[22] Filed: Sep. 27, 1994

[30] Foreign Application Priority Data

Oct. 7, 1993 [JP] Japan .................. 5-054534 U

[51] Int. Cl.⁶ .................. F16H 45/02; F16D 3/14
[52] U.S. Cl. .................. 192/3.29; 192/207
[58] Field of Search .................. 192/3.27, 3.28, 192/3.29, 3.3, 30 V, 106.2

[56] References Cited

U.S. PATENT DOCUMENTS

| | | | |
|---|---|---|---|
| 4,413,711 | 11/1983 | Lamarche | 192/3.28 |
| 4,437,551 | 3/1984 | Gimmler et al. | 192/3.28 |
| 4,867,290 | 9/1989 | Macdonald et al. | 192/3.28 |
| 4,919,241 | 4/1990 | Koshimo | 192/3.29 |
| 4,969,544 | 11/1990 | Fujimoto | 192/3.29 |
| 4,982,821 | 1/1991 | Tanaka | 192/3.29 |
| 5,070,974 | 12/1991 | Kirkwood | 192/3.3 |
| 5,310,033 | 5/1994 | Shibayama | 192/3.29 |
| 5,377,796 | 1/1995 | Friedmann et al. | 192/3.29 |

FOREIGN PATENT DOCUMENTS 58-193966  11/1983  Japan .................. 192/3.29

*Primary Examiner*—Andrea L. Pitts
*Attorney, Agent, or Firm*—Shinjyu Office of Patent Attorneys

[57] ABSTRACT

A lockup unit for a torque converter is provided with a front cover coupled to an input member and a turbine coupled to an output member. The lockup unit includes: a disc-like piston disposed movably between the front cover and the turbine and pressingly contactable against the front cover; a flexible coupling mechanism for coupling the disc-like piston and the turbine in a circumferential direction; and a frictional resistance generating mechanism including a stationary member fixed to the disc-like piston and a flexible member which is brought into pressing contact with the stationary member so as to be rotatable together with the turbine, for generating a frictional resistance when the piston and the turbine are rotated relative to each other, to thereby reduce the number of the necessary mechanical components.

5 Claims, 3 Drawing Sheets

LOCKUP UNIT FOR TORQUE CONVERTER HAVING A FRICTION ELEMENT

BACKGROUND OF THE INVENTION

The present invention relates to a lockup unit in a torque converter, and more particularly to a lockup unit which engages a friction element which co-acts with another element fixed to the turbine of the torque converter for mechanically coupling the lockup unit and the turbine.

Torque converters are commonly used to transmit torque between the crankshaft of an internal combustion engine and an automatic transmission. A torque converter typically includes a front cover coupled to the crankshaft of the engine and is filled with an hydraulic fluid. Within the front cover are three kinds of vaned wheels, an impeller, a turbine, and a stator. The impeller is usually coupled to a front cover of the torque converter and rotates with the front cover. The turbine, which is rotatably disposed within the front cover, is usually coupled to the input shaft of the automatic transmission and rotates therewith. When torque is input from the engine to the front cover, the impeller vanes force fluid into the turbine, causing it to rotate. As a result, the torque is transmitted to the transmission. The stator remains generally stationary and serves to direct the flow of fluid between the impeller and turbine.

In at least one prior art torque converter, a lockup unit is disposed between the front cover and the turbine for selectively mechanically connecting the two. The lockup unit is composed of a disc-like piston to be brought into pressing contact with the front cover and a flexible coupling mechanism disposed between the turbine and the lockup unit for absorbing the vibrations experienced when the disc-like piston and the front cover contact one another. The flexible coupling mechanism typically includes a torsion spring or the like for absorbing a shock caused by the piston being brought into pressing contact with the front cover.

Recently, lockup units have also been provided a frictional resistance generating mechanism for the purpose of attenuating a twist vibration experienced when the lockup unit engages the front cover.

The conventional frictional resistance generating mechanism provided in the lockup unit is composed essentially of a plate member disposed between the lockup unit and the turbine, engaged to be rotatable together with the turbine, a flexible member for biasing the plate member into friction engagement with a portion of the lockup unit, and a support member for supporting the flexible member. A torque converter which incorporates a friction mechanism in its lockup unit generally has an increase in the number of the mechanical parts due to the presence of the frictional resistance generating mechanism.

SUMMARY OF THE INVENTION

An object of the present invention is to provide a lockup unit having a frictional resistance generating mechanism for a toque converter in which the number of the mechanical parts may be reduced.

A lockup unit for a torque converter according to the present invention, is provided between a front cover of a torque converter and a turbine in the torque converter, the front cover coupled to an input member, such as the crankshaft of an engine, and the turbine coupled to an output member, such as the input shaft of a transmission. The lockup unit is coupled to the turbine via a flexible coupling mechanism, such that the flexible coupling mechanism allows for limited rotary displacement between the lockup unit and the turbine, but generally the lockup unit rotates with the turbine. The lockup unit includes a disc-like piston, the flexible coupling mechanism and a frictional resistance generating mechanism.

The disc-like piston is disposed to be movable in an axial direction between the front cover and the turbine and selectively contacts the front cover. The flexible coupling mechanism couples the disc-like plate and the turbine in the circumferential direction, but allows for limited rotary displacement therebetween. The frictional resistance generating mechanism includes a stationary member fixed to the disc-like piston and a flexible member that is engaged with the turbine to be rotatable together with the turbine and that is in pressing contact with the stationary member. The frictional resistance is generated when the piston and the turbine undergo relative rotation.

In the lockup unit, according to the present invention, in the lockup operation, the disc-like piston is brought into pressing contact with the front cover. The torque fed from the input member is transmitted directly to the output member through the front cover, the lockup unit and the turbine. When the lockup unit is subjected to a twist vibration, the piston and the turbine will take repeated relative rotation through the flexible coupling mechanism. At this time, the flexible member is slid under the condition that it is in pressing contact with the stationary member fixed to the disc-like plate. Thus, the frictional resistance generated may attenuate the energy of the twist vibration. Therefore, it is possible to suppress the twist vibration being transmitted to the output member.

In the lockup unit, the conventional plate member is dispensed with and the flexible member per se is brought into pressing contact with the stationary member on the disc-like plate side. As a result, it is possible to reduce the number of the mechanical parts.

BRIEF DESCRIPTION OF THE DRAWINGS

These and other objects, features, aspects and advantages of the present invention will become more fully apparent from the following detailed description of the present invention when taken in conjunction with the accompanying drawings where like reference numerals denote corresponding parts throughout, in which.

DESCRIPTION OF THE PREFERRED EMBODIMENTS

Figure 1:
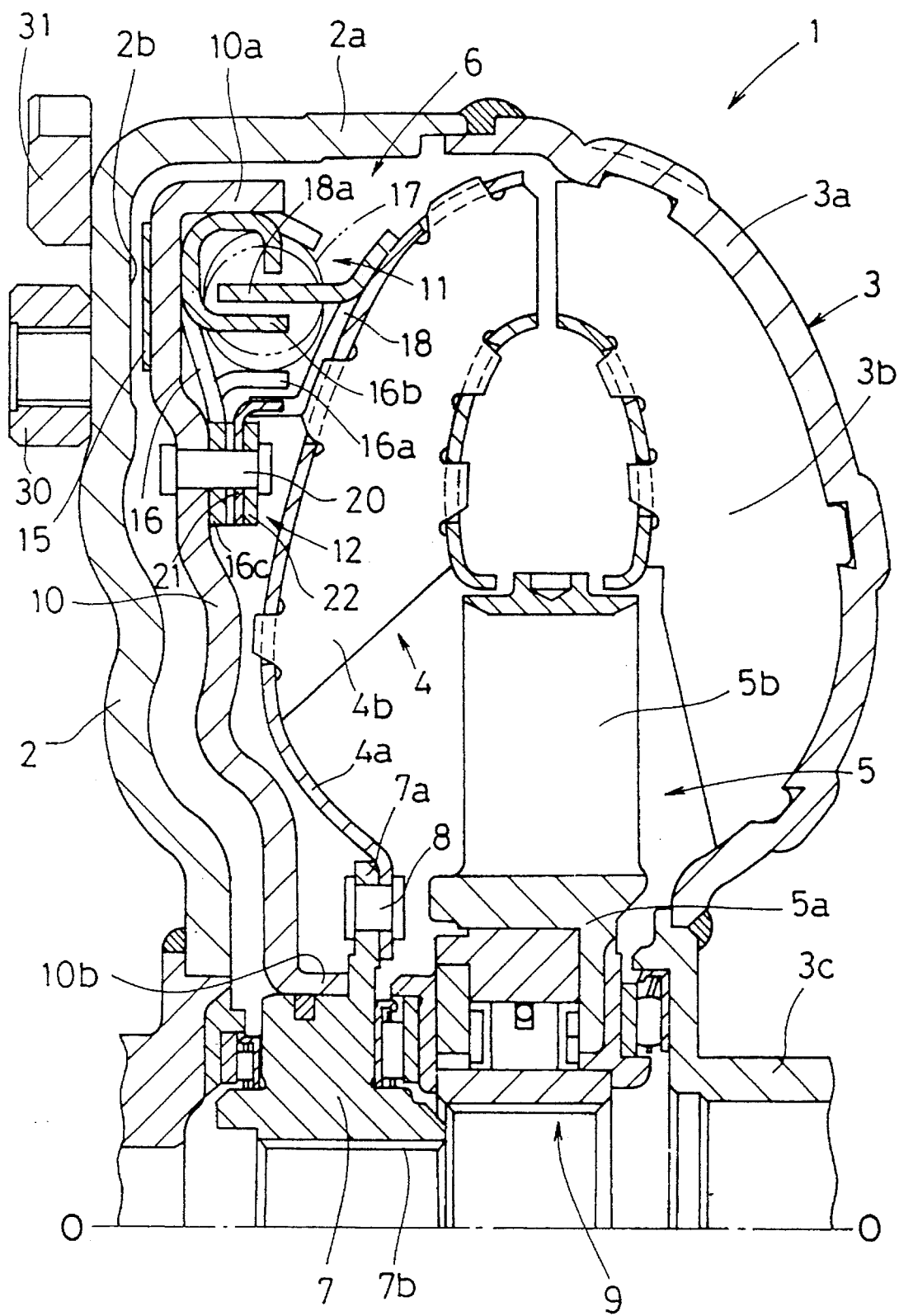
FIG. 1 is a schematic, partial cross-sectional view showing torsion springs used in one embodiment of the present invention.
Figure 2:
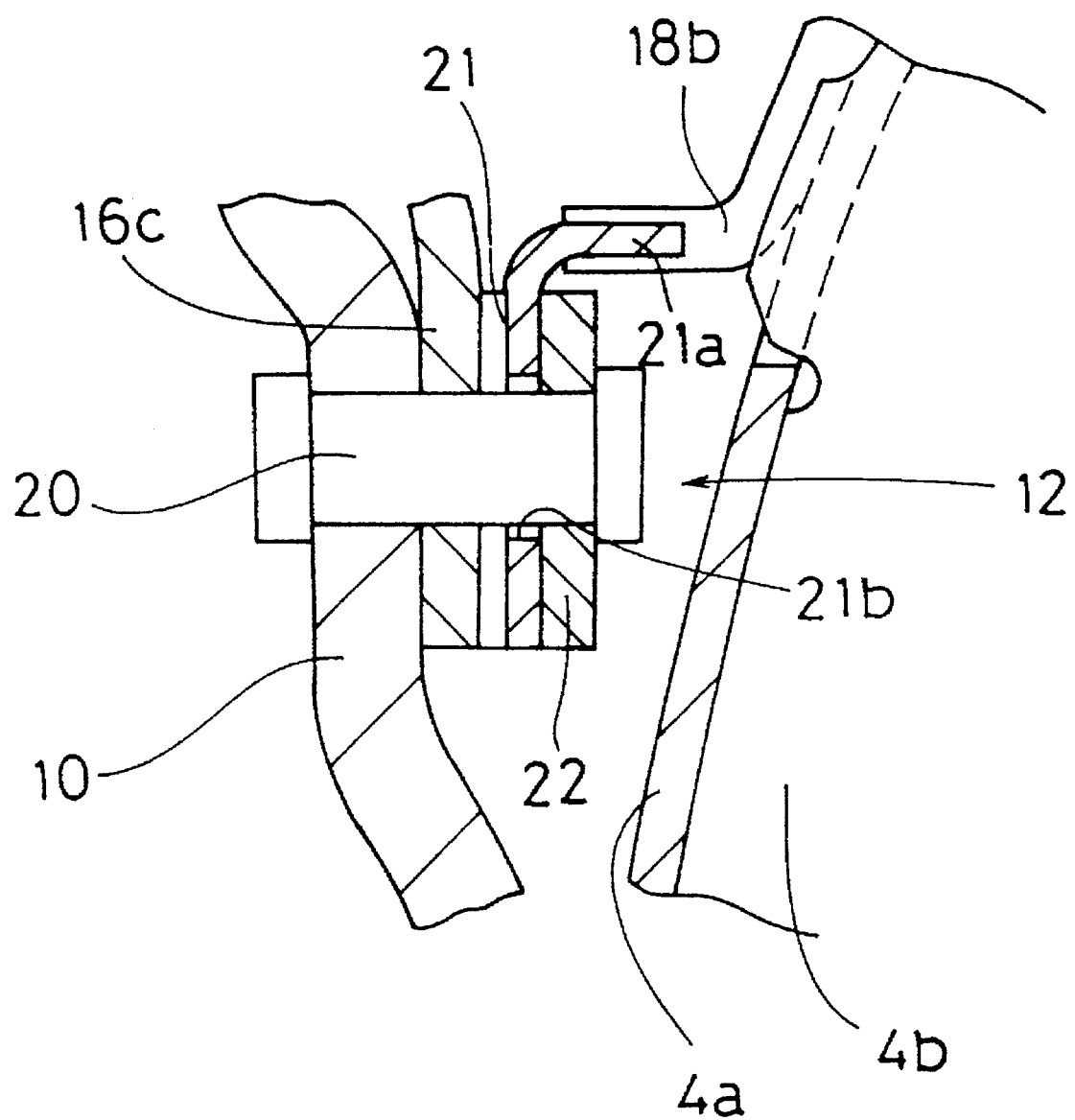
FIG. 2 is an enlarged view of a portion of FIG. 1.
Figure 3:
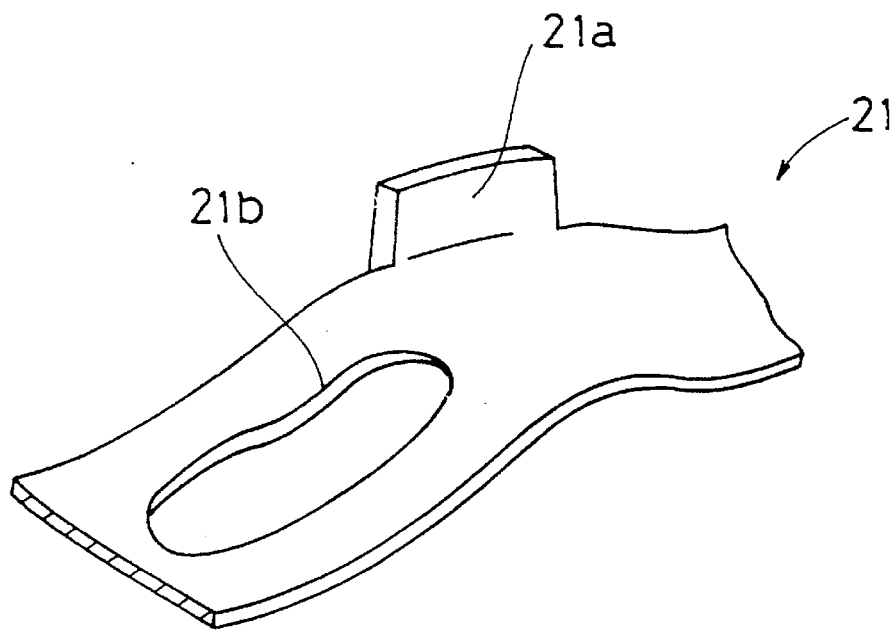
FIG. 3 is a fragmentary partial perspective view showing a wave spring depicted in FIG. 1.

The present invention will now be described in detail with reference to the accompanying drawings. FIG. 1 shows a torque converter 1 to which a lockup unit in accordance with the present invention is applied. In this unit, O-O represents a rotational centerline of the torque converter 1. An engine (not shown) is disposed on the left side of FIG. 1, and a transmission (not shown) is disposed on the right side of FIG. 1.

The torque converter 1 defines a working oil chamber together with a front cover 2 and an impeller shell 3a fixed to an outer peripheral wall 2a of the front cover 2. The impeller shell 3a is fixed at its inner circumferential end portion to an impeller hub 3c. A plurality of nuts 30 are fastened to the front cover 2. A flexible plate (not shown) on the engine side is fixed to the nuts 30. Also, a ring gear 31 is fixed to the front cover 2. Moreover, a flat frictional surface 2b is formed in an inner wall of the outer peripheral portion of the front cover 2.

A torque cover body composed of an impeller 3, a turbine 4 and a stator 5 and a lockup unit 6 are disposed in the working oil chamber within the torque converter 1.

A plurality of impeller blades 3b are fixed within the impeller shell 3a. The impeller 3 is formed of the impeller blades 3b and the impeller shell 3a. The turbine 4 is arranged so as to face the impeller 3. The turbine 4 is composed of a turbine shell 4a and a plurality of turbine plates 4b fixed within the turbine shell 4a. An inner circumferential end portion of the turbine shell 4a is fixed to a flanged portion 7a of a turbine hub 7 by rivets 8. The turbine hub 7 is provided at its inner circumferential portion with a spline hole 7b for engaging with an output shaft (not shown).

The stator is interposed between the inner circumferential portion of the impeller 3 and the inner circumferential portion of the turbine 4. The stator 5 serves to adjust a flow direction of the working oil which is to be returned from the turbine 4 to the impeller 3. The stator 5 is composed of an annular stator carrier 5a and a plurality stator blades 5b formed on the outer circumferential surface of the stator carrier 5a. A one-way clutch mechanism 9 is arranged in the inner circumferential portion of the stator 5.

The lockup unit 6 is interposed between the front cover 2 and the turbine shell 4a, and is essentially composed of a disc-like piston 10, a flexible coupling mechanism 11 and a frictional resistance generating mechanism 12.

An annular frictional member 15, which faces the fictional surface 2b of the front cover 2, is adhered to an outer peripheral end of the disc-like piston 10. The piston 10 has, at its outer peripheral edge, a cylindrical outer peripheral wall 10a extending toward the transmission (i.e., the right in FIG. 1). At its inner circumferential edge, the piston 10 includes a cylindrical inner peripheral wall 10b extending toward the transmission side of FIG. 1. The inner peripheral wall 10b of the piston is supported to the outer circumferential surface of the turbine hub 7 so as to be slidable in the axial direction and in the circumferential direction.

The flexible coupling mechanism 11 is disposed inside of the outer peripheral wall 10a of the piston 10. The flexible coupling mechanism 11 is essentially composed of a disc-like retaining plate 16, a plurality of torsion springs 17 and a lock ring 18. The retaining plate 16 is fixed at its inner circumferential portion to the piston 10 with rivets 20. The retaining plate 16 is provided at its outer circumferential portion with a sleeve portion 16a extending in an annular shape. The retaining plate 16 incorporates therein the plurality of torsion springs 17 each extending in the circumferential direction. Both end portions, in the circumferential direction, of each torsion spring 17 are supported by bent claws 16b formed in the retaining plate 16.

Figure 4:
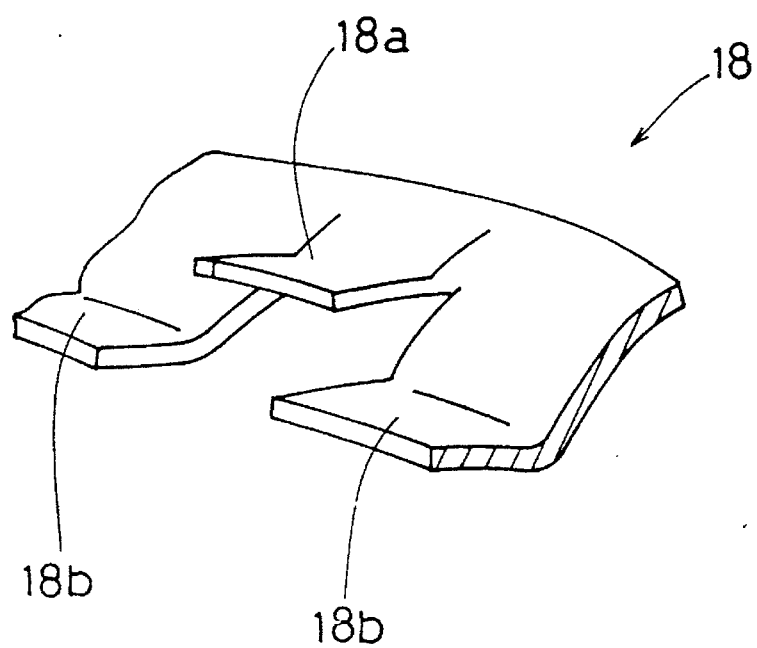
FIG. 4 is a fragmentary partial perspective view showing a lock ring depicted in FIG. 1.

The lock ring 18 is fixed to a surface of the turbine shell 4a facing the piston 10. The lock ring 18 is attached to the turbine wheel 4a by, for example, spot welding. As best shown in FIG. 4, first bent claws 18a and second bent claws 18b are alternatively formed in the inner circumferential portion of the lock ring 18. Each of the first bent claws 18a is bent radially outwardly more deeply than each of the second bent claws 18b. The first bent claw 18a partially retains, in the circumferential direction, the torsion springs 17. Thus, the piston 10 and the turbine shell 4a are elastically coupled with each other in the circumferential direction through the retaining plate 16, the torsion springs 17 and the lock ring 18 of the flexible coupling mechanism 11. The second bent claws 18b of the lock ring 18 contact and are actively engaged in a frictional resistance generating mechanism 12 (to be described below).

The frictional resistance generating mechanism 12 is generally composed of a wave spring 21 and a support plate 22. The support plate 22 is fixed on the turbine 4 side to the piston 10 by the rivets 20. The wave spring 21 is interposed between the inner circumferential edge 16c of the retaining plate 16 and the support plate 22. A plurality of projections 21a each extending on the turbine 4 side are disposed at regular intervals in the circumferential direction. The projections 21a are disposed between the second bent claws 18b of the lock ring 18. With such an arrangement, the wave spring 21 is coupled to the lock ring 18 so that it is movable in the axial direction but not movable in the circumferential direction relative to the ring 18.

Oblong holes 21b each extending in the circumferential direction are formed in the wave spring 21 where the wave spring 21 is in contact with the inner circumferential edge 16c of the retaining plate 16. A stem portion of each rivet 20 extends through the associated oblong hole 21b. With such an arrangement, the piston 10 and the support plate 22 are relatively rotatable within a predetermined angle relative to the wave spring 21. Incidentally, if a distance by which the rivets 20 may be moved within and along the oblong holes 21b formed in the wave spring 21 is shorter than a distance by which the torsion springs 17 are compressed between the retaining plate 16 and the first bent claws 18a of the lock ring 18, the rivets 20 may serve as positional stops, depending upon the particular response desired from the torque converter 1.

The operation of the above-described embodiment will now be described. A torque to be transmitted from a crank shaft on the engine side is transmitted to the front cover 2 of the torque converter 1. As a result, the front cover 2 and the impeller 3 are rotated so that the torque is transmitted to the turbine 4 through the working oil. The flow of working oil that will be returned from the turbine 4 back to the impeller 3 is adjusted by the stator 5. Then, the torque of the turbine 4 is transmitted to an output shaft (not shown) through the turbine hub 7.

When the output shaft (not shown) is rotated at a constant rotational speed, the hydraulic pressure of the working oil within the torque converter 1 is increased, and at the same time, the working oil stagnant between the front cover 2 and the piston 10 is drained. As a result, the piston 10 is pressed on the front cover 2. Then, the frictional member 15 of the piston 10 is brought into pressing contact with the frictional surface 2b of the front cover 2. As a result, the torque of the front cover 2 is mechanically transmitted from the piston 10 through the flexible coupling mechanism 11 to the turbine 4. Namely, the torque of the front cover 2 is transmitted to the output shaft (not shown) through the turbine 4. Accordingly, the energy loss may be suppressed to ensure a good fuel consumption rate.

Also, in the lockup operation, if the twist vibration is generated in the lockup unit 6, the piston 10 and the turbine 4 repeat relative angular displacement through the flexible coupling mechanism 11. During the rotations, the torsion springs 17 are expanded and compressed so that the wave spring 21 is fictionally slid relative to the inner circumferential edge 16c of the retaining plate 16 and the support plate 22. For this reason, the frictional resistances are generated on both sides of the wave spring 21 to attenuate the energy of the twist vibration.

In the frictional resistance generating mechanism 12, the wave spring 21 which engages with the turbine 4 side is brought into direct contact with the retaining plate 18 fixed to the piston 10 and the support plate 22. For this reason, it is unnecessary to separately provide a plate, a frictional member or the like unlike the conventional structure. Accordingly, it is possible to reduce the number of the mechanical components in the frictional resistance generating mechanism 12.

In another embodiment of the invention, it is possible to use any other flexible members such as a cone spring instead of the wave spring.

In the lockup unit of the torque converter according to the present invention, it is possible to dispense with a conventional plate member, and the flexible member per se is brought into contact with the plate on the disc-like plate side. Thus, it is possible to reduce the number of the mechanical parts in comparison with the convention arrangement.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A friction resistance generating mechanism for a lockup torque converter disposed between a lockup piston and a turbine within the torque converter, the friction resistance generating mechanism consisting of:

a first generally flat ring-like member having a rippled contour, a plurality of elongated slots formed therein and a plurality of axially aligned fingers extending from one radial edge thereof;

a support ring having a plurality of apertures formed therein;

a retaining ring having a plurality of apertures formed therein and a plurality of spring retaining and spring engaging portions engageable with a plurality of spring members;

a plurality of pins coupled to a lockup piston of a lockup torque converter, one of each of said pins extending through a corresponding one of said elongated slots in said first ring, one of said apertures of said support ring and one of said apertures in said retaining ring such that said first ring is disposed between said retaining ring and said support ring allowing limited rotary displacement between said retaining ring and said first ring, and upon displacement of said first ring friction being produced;

a second ring-like member connected to a turbine in the lockup torque converter having first and second sets of axially extending fingers formed thereon, said first set of axially extending fingers confining said plurality of fingers formed on said first ring-like member, allowing for axial movement of said first ring-like member with respect to said second ring-like member, said second set of axially extending fingers engagable with the plurality of spring elements.

2. A friction resistance generating mechanism for a lockup torque converter comprising:

a first ring-like member having a plurality of elongated slots formed therein and a plurality of generally axially extending fingers;

a support ring having a plurality of apertures formed therein;

a plurality of pins coupled to a lockup piston of a lockup torque converter, one of each of said pins extending through a corresponding one of said elongated slots in said first ring and one of said apertures of said support ring such that said first ring is disposable between said first ring and the lockup piston allowing limited rotary displacement between said support ring and said first ring;

a second ring-like member connected to a turbine in the lockup torque converter having first and second sets of axially extending fingers formed thereon, said first set of axially extending fingers radially confining said plurality of generally axially extending fingers formed on said first ring-like member, allowing for axial movement of said first ring-like member with respect to said second ring-like member, said second set of axially extending fingers engagable with spring elements coupled to the lockup piston.

3. A friction resistance generating mechanism as set forth in claim 2 wherein said first ring-like member being formed with ripples.

4. A friction resistance generating mechanism as set forth in claim 2 further comprising:

a retaining ring having a plurality of apertures formed therein and a plurality of spring retaining and spring engaging portions engageable with the spring members, said pins extending through said apertures such that said retaining ring is disposable against a surface of the lockup piston, said first ring is disposed between said retaining ring and said support ring allowing limited rotary displacement between said retaining ring and said first ring.

5. A lockup unit for a torque converter comprising:

a torque converter housing having a rotatable turbine disposed within said housing;

a disc-like piston disposed between an inner surface of said housing and said turbine, said piston axially displaceable therebetween for selective engagement and disengagement with said surface;

a interconnecting flexible coupling and friction producing mechanism coupling said disc-like piston and the turbine for limited rotary displacement therebetween, including;

a first member connected to said disc-like piston for rotation therewith having at least one spring retaining member and a first spring engaging member, a friction member in pressing contact with said first member, disposed for limited rotary displacement with said first member and formed with at least one extending finger, a second member connected to said turbine having a second spring engaging member and at least two extending fingers which engage either side of said friction member extending finger, and a spring member disposed between said first and second spring engaging members.

* * * * *